United States Patent
Maeno

(10) Patent No.: US 8,270,663 B2
(45) Date of Patent: Sep. 18, 2012

(54) WATERMARKED INFORMATION EMBEDDING APPARATUS

(75) Inventor: Kurato Maeno, Saitama (JP)

(73) Assignee: Oki Data Corporation, Tokyo (JP)

( * ) Notice: Subject to any disclaimer, the term of this patent is extended or adjusted under 35 U.S.C. 154(b) by 1162 days.

(21) Appl. No.: 11/585,817

(22) Filed: Oct. 25, 2006

(65) Prior Publication Data

US 2007/0104350 A1    May 10, 2007

(30) Foreign Application Priority Data

Nov. 10, 2005    (JP) .................................. 2005-326371

(51) Int. Cl.
*G06K 9/00* (2006.01)
*G06K 9/34* (2006.01)
*H04N 1/40* (2006.01)
*G06F 3/12* (2006.01)

(52) U.S. Cl. ........ 382/100; 382/176; 382/177; 382/178; 382/464; 358/1.1; 358/1.9; 358/3.1; 358/3.28

(58) Field of Classification Search .................. 382/176, 382/464, 177, 178; 358/1.9, 2.1, 3.1–3.32
See application file for complete search history.

(56) References Cited

U.S. PATENT DOCUMENTS

| | | | | |
|---|---|---|---|---|
| 4,365,275 A * | 12/1982 | Berman et al. | ................. | 358/3.1 |
| 4,722,008 A * | 1/1988 | Ibaraki et al. | ................. | 382/192 |
| 4,811,115 A * | 3/1989 | Lin et al. | ....................... | 382/192 |
| 4,868,684 A * | 9/1989 | Suzuki | .................. | 358/3.15 |
| 5,267,333 A * | 11/1993 | Aono et al. | ................... | 382/166 |
| 5,271,095 A * | 12/1993 | Yamada | ........................ | 345/428 |
| 5,293,430 A * | 3/1994 | Shiau et al. | .................. | 382/173 |
| 5,486,927 A * | 1/1996 | Koizumi et al. | ............. | 358/3.07 |
| 5,602,970 A * | 2/1997 | Janser | ............................ | 358/1.9 |
| 5,684,891 A * | 11/1997 | Tanaka et al. | ................. | 382/178 |
| 5,798,846 A * | 8/1998 | Tretter | .......................... | 382/262 |
| 5,848,185 A * | 12/1998 | Koga et al. | .................... | 382/173 |
| 5,905,819 A * | 5/1999 | Daly | ............................ | 382/284 |
| 6,078,697 A * | 6/2000 | Ng | ................................ | 382/275 |
| 6,122,318 A * | 9/2000 | Yamaguchi et al. | .......... | 375/240 |
| 6,160,913 A * | 12/2000 | Lee et al. | ...................... | 382/176 |
| 6,252,971 B1 * | 6/2001 | Wang | ............................ | 382/100 |
| 6,321,244 B1 * | 11/2001 | Liu et al. | ....................... | 715/201 |
| 6,549,658 B1 * | 4/2003 | Schweid et al. | .............. | 382/173 |
| 6,556,711 B2 * | 4/2003 | Koga et al. | .................... | 382/173 |
| 6,714,676 B2 * | 3/2004 | Yamagata et al. | ............ | 382/175 |
| 6,775,394 B2 * | 8/2004 | Yu | ................................. | 382/100 |
| 6,868,183 B1 * | 3/2005 | Kodaira et al. | ............... | 382/203 |
| 7,027,647 B2 * | 4/2006 | Mukherjee et al. | ........... | 382/173 |

(Continued)

FOREIGN PATENT DOCUMENTS

JP    10123772 A *    5/1998

(Continued)

*Primary Examiner* — Chan S Park
*Assistant Examiner* — Avinash J Yentrapati
(74) *Attorney, Agent, or Firm* — Rabin & Berdo, P.C.

(57) ABSTRACT

The watermarked information embedding apparatus which inputs an image and embeds watermarked information in the input image, comprises: picture element determining means which determines whether it is a picture element constituting a background image for each of picture elements which constitute the input image; background picture element removing means which removes all of background picture elements determined as picture elements constituting the background image by the picture element determining means; and watermarked information embedding means which embeds the watermarked information in an image constituted by a picture element from which the background picture element constituting the input image is removed by the background picture element removing means.

7 Claims, 18 Drawing Sheets

U.S. PATENT DOCUMENTS

| | | | |
|---|---|---|---|
| 7,027,660 B2 * | 4/2006 | Hersch et al. | 382/257 |
| 7,085,399 B2 * | 8/2006 | Suzaki | 382/100 |
| 7,130,085 B2 * | 10/2006 | Ohara et al. | 358/3.06 |
| 7,245,740 B2 * | 7/2007 | Suzaki | 382/100 |
| 7,312,902 B2 * | 12/2007 | Mastie et al. | 358/3.28 |
| 7,352,879 B2 * | 4/2008 | Wang | 382/100 |
| 7,379,594 B2 * | 5/2008 | Ferman et al. | 382/176 |
| 7,394,570 B2 * | 7/2008 | Klein et al. | 358/3.06 |
| 7,411,699 B2 * | 8/2008 | Lee | 358/1.9 |
| 7,424,151 B2 * | 9/2008 | Lin et al. | 382/173 |
| 7,656,556 B2 * | 2/2010 | Wang | 358/2.1 |
| 2002/0039444 A1* | 4/2002 | Yamagata et al. | 382/199 |
| 2002/0061133 A1* | 5/2002 | Ohta et al. | 382/176 |
| 2002/0064307 A1* | 5/2002 | Koga et al. | 382/176 |
| 2003/0007187 A1* | 1/2003 | Curry | 358/3.26 |
| 2003/0021442 A1* | 1/2003 | Suzaki | 382/100 |
| 2003/0076979 A1* | 4/2003 | Matsui | 382/100 |
| 2003/0123729 A1* | 7/2003 | Mukherjee et al. | 382/176 |
| 2003/0210803 A1* | 11/2003 | Kaneda et al. | 382/100 |
| 2004/0042659 A1* | 3/2004 | Guo et al. | 382/176 |
| 2004/0114187 A1* | 6/2004 | Furukawa | 358/3.08 |
| 2004/0125409 A1* | 7/2004 | Yamaguchi et al. | 358/2.1 |
| 2004/0236951 A1* | 11/2004 | Zhao | 713/179 |
| 2004/0247204 A1* | 12/2004 | Lim et al. | 382/298 |
| 2005/0013502 A1* | 1/2005 | Lim | 382/254 |
| 2005/0018845 A1* | 1/2005 | Suzaki | 380/243 |
| 2005/0275855 A1* | 12/2005 | Mizes et al. | 358/1.9 |
| 2006/0023940 A1* | 2/2006 | Katsuyama | 382/165 |
| 2006/0041840 A1* | 2/2006 | Blair et al. | 715/513 |
| 2006/0072782 A1* | 4/2006 | Abe et al. | 382/100 |
| 2006/0087694 A1* | 4/2006 | Purdum et al. | 358/3.2 |
| 2007/0005977 A1* | 1/2007 | Tohne et al. | 713/176 |
| 2007/0065012 A1* | 3/2007 | Yamakado et al. | 382/182 |
| 2007/0079124 A1* | 4/2007 | Maeno | 713/176 |
| 2007/0127771 A1* | 6/2007 | Kaneda et al. | 382/100 |
| 2008/0159615 A1* | 7/2008 | Rudaz et al. | 382/137 |
| 2008/0204811 A1* | 8/2008 | Wang | 358/3.08 |
| 2009/0257076 A1* | 10/2009 | Qi et al. | 358/1.14 |

FOREIGN PATENT DOCUMENTS

| | | | |
|---|---|---|---|
| JP | 2001-094755 A | | 4/2001 |
| JP | 2001094755 A | * | 4/2001 |
| JP | 3628312 | | 4/2003 |
| JP | 2005-142971 A | | 6/2005 |

* cited by examiner

FIG.6

| SHAPE | CYCLE | PHASE | POSITION |
|---|---|---|---|
| ■ | HORIZONTAL CYCLE Lh<br>VERTICAL CYCLE Lv | HORIZONTAL PHASE $Ph_1$<br>VERTICAL PHASE $Pv_1$ | (X1,Y1),(X3,Y1),(X1,Y3),(X3,Y3),(X1,Y5),(X3,Y5) |
| | | HORIZONTAL PHASE $Ph_2$<br>VERTICAL PHASE $Pv_2$ | (X2,Y2),(X4,Y2),(X6,Y2),(X8,Y2),(X2,Y4),(X4,Y4),(X6,Y4),(X8,Y4),(X2,Y6),(X4,Y6),(X6,Y6),(X8,Y6) |
| ✜ | HORIZONTAL CYCLE Lh<br>VERTICAL CYCLE Lv | HORIZONTAL PHASE $Ph_1$<br>VERTICAL PHASE $Pv_1$ | (X5,Y1),(X7,Y1),(X5,Y3),(X7,Y3),(X5,Y5),(X7,Y5) |

193a

BACKGROUND-REMOVED IMAGE 203   BACKGROUND IMAGE 207

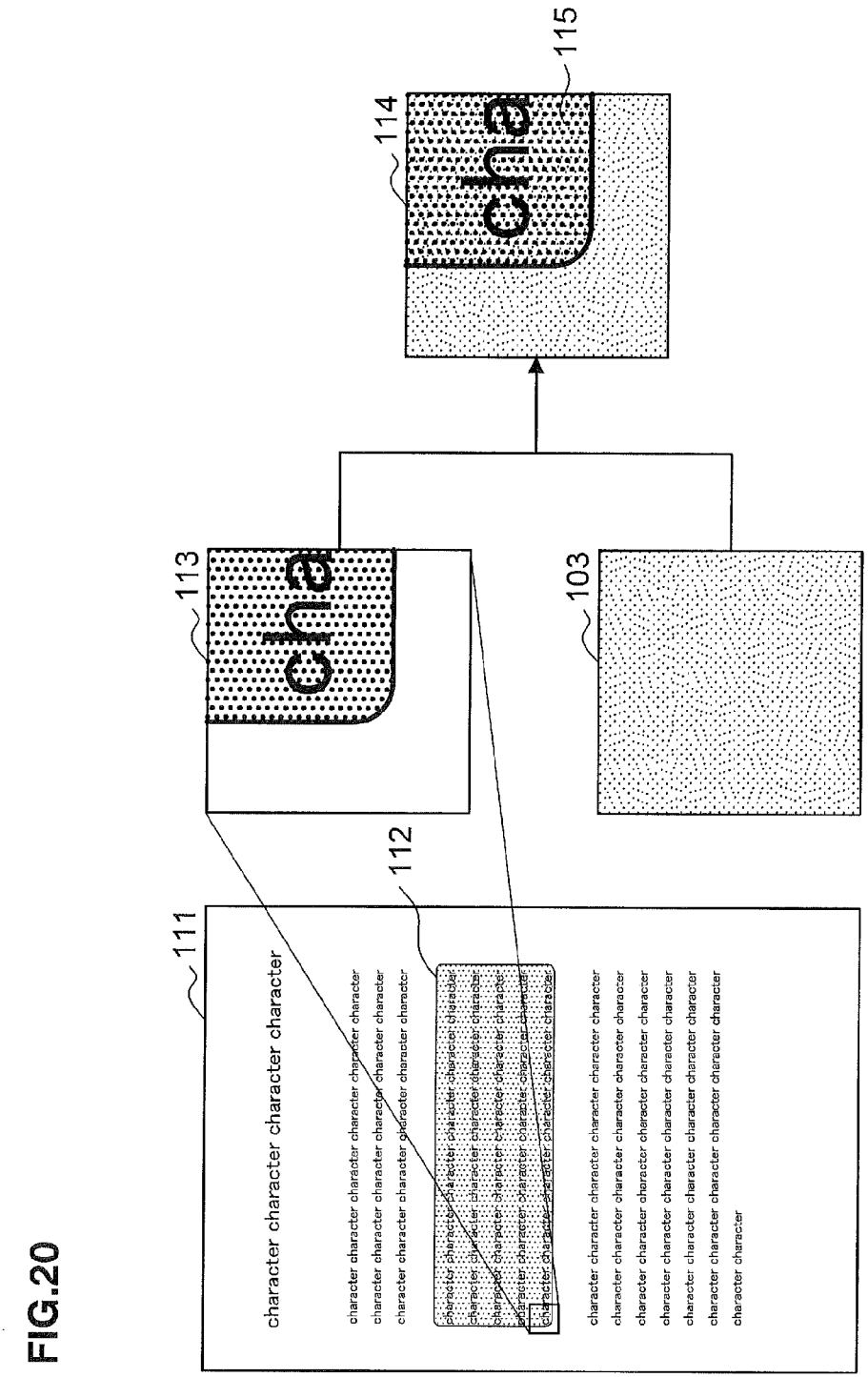

WATERMARKED INFORMATION EMBEDDING APPARATUS

The disclosure of Japanese Patent Application No. JP2005-326371, filed Nov. 10, 2005, entitled "watermarked information embedding apparatus, watermarked information embedding method, and computer program". The contents of that application are incorporated herein by reference in their entirety.

BACKGROUND OF THE INVENTION

1. Field of the Invention

The present invention relates to a technique for adding watermarked information to an image such as a document image.

2. Description of the Related Art

If characters or graphics are printed on a printing medium such as a copy paper and the printed matter is output, it is possible to easily grasp contents printed on the printed matter by seeing the text or image printed on the printed matter.

On the other hand, there exists "digital watermarking" in which information for preventing copying or counterfeiting or secret information is embedded in the digital data such as graphic data and text data. There exists a technique for preventing dishonesty such as a counterfeit by embedding the "digital watermarking" in the text data or the like.

In recent years, the "digital watermarking" is included in a document image by disposing and rendering a black picture element (or black dot) in a background of the document image using a predetermined method (e.g., see Japanese Patent No. 3628312).

As shown in FIG. 19, if a watermarked image 103 is embedded in a background of a document image 102 by a watermarked information embedding apparatus, a document image 104 in which the watermarked image 103 is embedded can be printed.

As shown in the watermarked document image 104, a tint block of the watermarked image 103 is superposed on "character", and a portion of the tint block disappears. However, if the watermarked information is provided with redundancy, it is possible to precisely read the watermarked information.

However, when the background of the document image is shaded, since the shaded figure and the tint block of the watermarked information are superposed on each other, this exceeds the redundancy of the watermarked information, and it is difficult to precisely read the watermarked information.

As shown in FIG. 20, it can be found that a shaded image 112 exists in a document image 111 together with characters. As shown in the watermarked document image 114, since the figure of the shaded image 112 and the tint block of the watermarked information 113 are superposed on each other, it is difficult to precisely read the watermarked information in this superposed portion.

When the document image 111 is shaded over its wide range like the shaded image 112 existing in the document image 111, even if the watermarked information 113 is provided with sufficient redundancy, it is not possible to precisely read the watermarked information in the shaded portion. Ditto for a photograph image and an illustration image other tan the shaded image 112.

SUMMARY OF THE INVENTION

The present invention has been accomplished in view of the above problem, and it is an object of the invention to provide new and improved watermarked information embedding apparatus, watermarked information embedding method and computer program capable of embedding watermarked information so that the watermarked information can precisely be read from a document image having the watermarked information even when an image other than a document image is included in a document image.

To achieve the above object, a first aspect of the present invention provides a watermarked information embedding apparatus which inputs an image and embeds watermarked information in the input image, comprising: picture element determining means which determines whether it is a picture element constituting a background image for each of picture elements which constitute the input image; background picture element removing means which removes all of background picture elements determined as picture elements constituting the background image by the picture element determining means; and watermarked information embedding means which embeds the watermarked information in an image constituted by a picture element from which the background picture element constituting the input image is removed by the background picture element removing means. The watermarked information is information which is encoded to embed information to be embedded, but the watermarked information is not limited to this example.

To achieve the above object, another aspect of the invention provides a watermarked information embedding apparatus which inputs an image and embeds watermarked information in the input image, comprising: picture element determining means which determines whether it is a picture element constituting a background image for each of picture elements which constitute the input image; image separating means which separates, from the input image, a background image comprising a background picture elements which is determined as a picture element constituting the background image by the picture element determining means; and watermarked information embedding means in which the background image of the input image is separated by the image separating means and the watermarked information is embedded in the remaining image; wherein the watermarked information is embedded by the watermarked information embedding means in accordance with concentration and/or density of the picture element constituting the separated background image.

The picture element determining means may determine whether the background image is a picture element constituting at least one of a shaded image, a photograph image and a half-tone image.

The picture element determining means may classify all of background points constituting the background image based on a shape and a position of the background point with respect to each background point which is a point of aggregation in which one or more picture elements constituting the background image.

The picture element determining means may classify all of background points constituting the background image based on a shape, a cycle and a phase of the background point with respect to the with respect to each background point which is a point of aggregation in which one or more picture elements constituting the background image.

The background picture element removing means may estimate a position of the background point and determines whether the background point should be removed, based on a shape, a cycle and a phase of the background point, when the background point which is a point at which one or more picture elements constituting the background image are aggregated is superposed on at least one of a plurality of picture elements constituting a character, a sign and a ruled line of the input image.

The image separating means may estimate a position of the background point and determine whether the background point should be deleted, based on a shape, a cycle and a phase of the background point, when the background point which is a point at which one or more picture elements constituting the background image are aggregated is superposed on at least one of a plurality of picture elements constituting a character, a sign and a ruled line of the input image.

The background picture element removing means may remove a portion of the background point except the superposed portion thereof when the background point which is a point at which one or more picture elements constituting the background image are aggregated is superposed on at least one of a plurality of picture elements constituting a character, a sign and a ruled line of the input image.

The image separating means deletes a portion of the background point except the superposed portion thereof when the background point which is a point at which one or more picture elements constituting the background image are aggregated is superposed on at least one of a plurality of picture elements constituting a character, a sign and a ruled line of the input image.

When the background picture element removing means estimates the position of the background point and determines that the background point should be removed, and when the background point which is a point at which one or more picture elements constituting the background image are aggregated is superposed on at least one of a plurality of picture elements constituting a character, a sign and a ruled line of the input image, the background picture element removing means may remove a portion of the background point except the superposed portion thereof.

The background picture element removing means may estimate a portion of the background point except the superposed portion based on a region comprising at least one of the character, the sign and the ruled line, and removes the same when the background point which is a point at which one or more picture elements constituting the background image are aggregated is superposed on at least one of a plurality of picture elements constituting a character, a sign and a ruled line of the input image.

The image separating means may estimate a portion of the background point except the superposed portion based on a region comprising at least one of the character, the sign and the ruled line, and deletes the same from the input image when the background point which is a point at which one or more picture elements constituting the background image are aggregated is superposed on at least one of a plurality of picture elements constituting a character, a sign and a ruled line of the input image.

The background picture element removing means may delete one or more picture elements constituting an isolated point of the picture elements constituting the input image, based on a pattern dictionary prepared based on at least one of a shape, a cycle and a phase of the background point.

The image separating means may delete one or more picture elements constituting an isolated point of the picture elements constituting the input image, based on a pattern dictionary prepared based on at least one of a shape, a cycle and a phase of the background point.

The image separating means may delete, from the input image, a portion of the background point except the superposed portion thereof, and records all of the picture elements constituting the background point in the background image when the background point which is a point at which one or more picture elements constituting the background image are aggregated is superposed on at least one of a plurality of picture elements constituting a character, a sign and a ruled line of the input image.

The watermarked information embedding apparatus may further comprise means which converts data described in page description language into input image.

To achieve the above object, another aspect of the present invention provides a computer program allows the computer to function as the watermarked information embedding apparatus described above.

To achieve the above object, another aspect of the invention provides a watermarked information embedding method for inputting an image and for embedding watermarked information in the input image, comprising a picture element determining step which determines whether it is a picture element constituting a background image for each of picture elements which constitute the input image; a background picture element removing step which removes all of background picture elements determined as picture elements constituting the background image in the picture element determining step; and watermarked information embedding step which embeds the watermarked information in an image constituted by a picture element from which the background picture element constituting the input image is removed by the background picture element removing step.

To achieve the above object, another aspect of the invention provides a watermarked information embedding method for inputting an image and for embedding watermarked information in the input image, comprising a picture element determining step which determines whether it is a picture element constituting a background image for each of picture elements which constitute the input image; an image separating step which separates, from the input image, a background image comprising a background picture elements which is determined as a picture element constituting the background image by the picture element determining step; and a watermarked information embedding step in which the background image is separated from the input image in the image separating step and the watermarked information is embedded, wherein in the watermarked information embedding step, the watermarked information is embedded in accordance with concentration and/or density of the picture element constituting the separated background image.

As explained above, according to the present invention, even when an image other than a sentence is included in a document image, watermarked information can be embedded so that the watermarked information can precisely be read from the document image having watermarked information.

BRIEF DESCRIPTION OF THE DRAWINGS

FIG. 6 is an explanatory diagram showing one example of an outline structure of the pattern dictionary in a state in which a positional relation of a grid of dots of the first embodiment is obtained;

FIG. 20 is an explanatory diagram showing the outline of processing for embedding watermarked information of the conventional technique.

DETAILED DESCRIPTION OF THE PREFERRED EMBODIMENTS

Preferred embodiments of the present invention will be explained in detail with reference to the accompanying drawings. In the following explanation and the accompanying drawings, constituent elements having substantially the same functions and structures are designated with the same symbols, and redundant explanation thereof will be omitted.

First Embodiment

Figure 1:
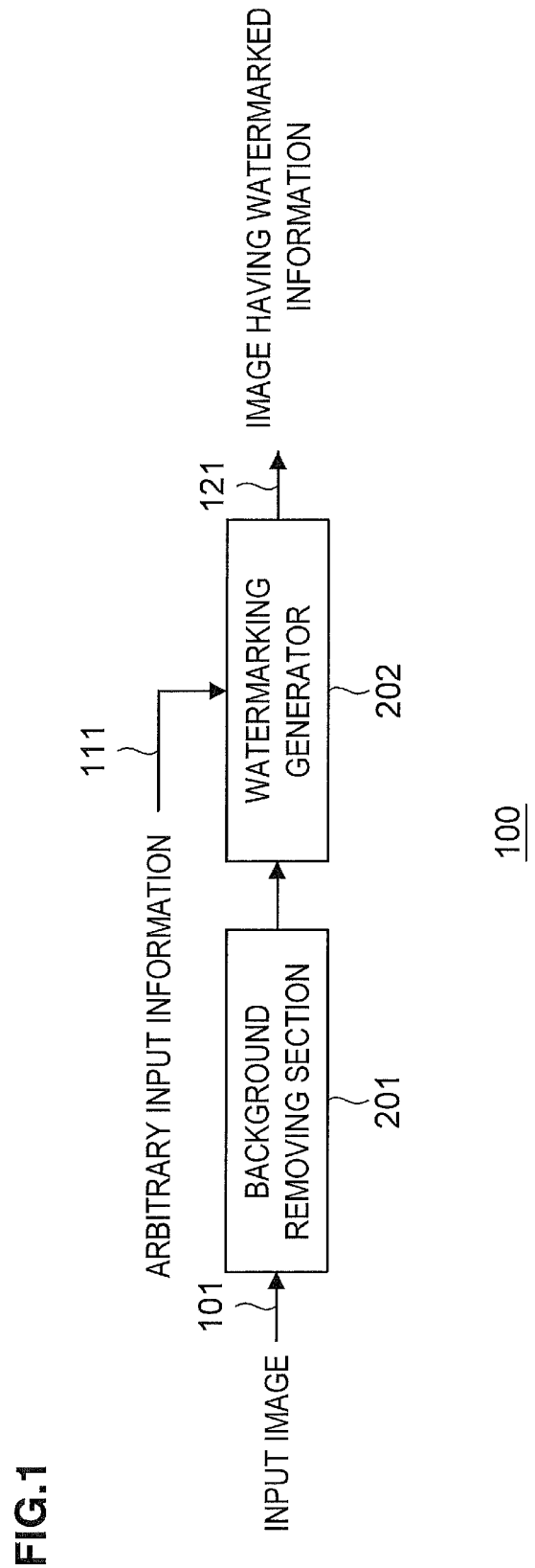
FIG. 1 is a block diagram showing one example of an outline structure of a watermarked information embedding apparatus according to a first embodiment.

First, a watermarked information embedding apparatus 100 of a first embodiment will be explained with reference to FIG. 1. FIG. 1 is a block diagram showing one example of an outline structure of the watermarked information embedding apparatus according to the first embodiment.

As shown in FIG. 1, the watermarked information embedding apparatus 100 includes a background removing section 201 for removing a background image from an input image 101 which is input from outside, and a watermarking generator 202 which generates an image having watermarked information 121 from arbitrary input information 111 which is to be embedded as watermarked information and from an image from which the background image is deleted.

Although detailed explanation is omitted, the watermarked information embedding apparatus 100 may function as a printer. In this case, the printer includes a controller corresponding to a CPU and the like, a display for displaying a printing state, an input section for receiving printing instructions, a storing section such as a memory or a hard disk for storing a program and the like such as firmware.

Figure 2:
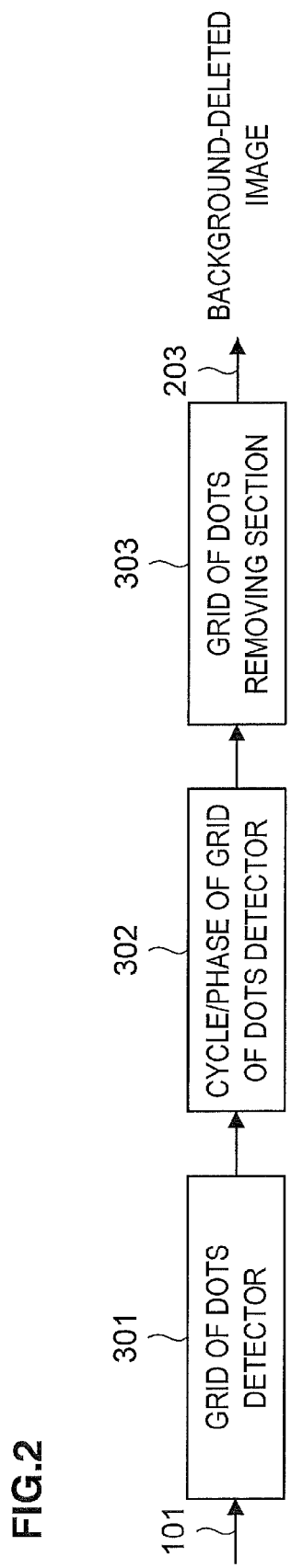
FIG. 2 is a block diagram showing one example of an outline structure of a background removing section of the first embodiment.

Next, the background removing section 201 will be explained in detail. FIG. 2 is a block diagram showing one example of an outline structure of the background removing section of the first embodiment.

As shown in FIG. 2, the background removing section 201 outputs a background-deleted image 203 in which a document image having characters, signs, ruled lines and the like from the input image 101 and from which a background image such as a shaded image and a photograph image are removed. The background removing section 201 includes a grid of dots detector 301, a cycle/phase of grid of dots detector 302 and a grid of dots removing section 303.

Figure 3:
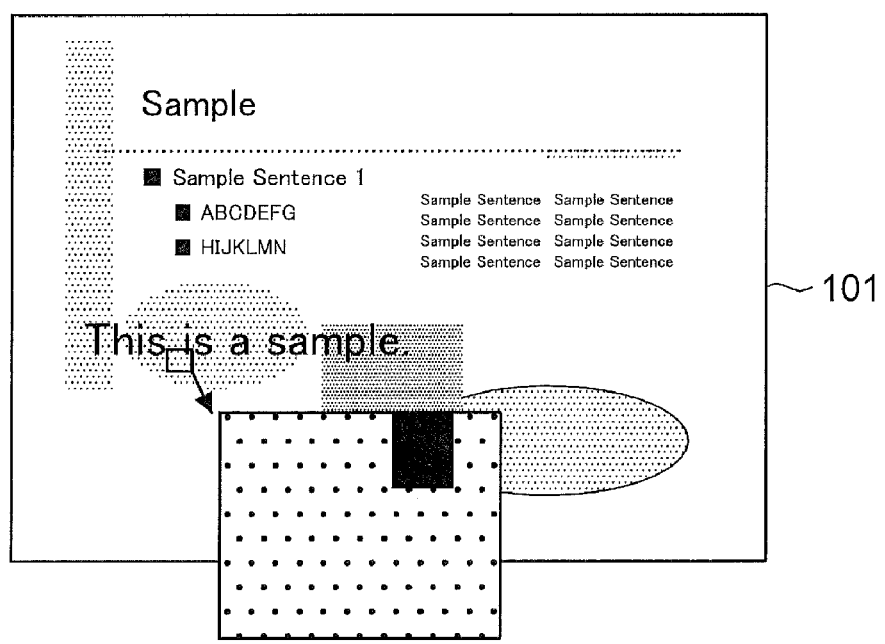
FIG. 3 is an explanatory diagram showing one example of an outline structure of an input image of the first embodiment.

Next, the input image 101 of the first embodiment will be explained with reference to FIG. 3. FIG. 3 is an explanatory diagram showing one example of an outline structure of the input image 101 of the first embodiment.

The input image 101 is a document image or the like, and is graphic data comprising a plurality of picture elements. At least, a character, graphics, a sign, a static image (or photograph) or a symbol, or a combination of any of them are included in the input image 101.

Therefore, examples of the input image 101 are only characters such as a novel, and a combination of static images and characters such as a newspaper. Graphics in this specification widely includes a character, graphics, a sign or a combination thereof included in graphic data.

As shown in FIG. 3, the input image 101 of the first embodiment is an image including at least one of a plurality of characters, signs, ruled lines, shaded images, and static images. That is, the input image 101 is graphic data including at least one of the characters, signs, ruled lines, shaded images and static images as the background image of the document image having a plurality of characters.

The shaded image and the static image (or photograph image) included in the input image 101 of the first embodiment are expressed as an aggregation of picture elements or dots by dithering.

Therefore, the input image 101 is an image printed on a paper sheet. More specifically, a white picture element region in the input image is a portion where nothing is printed, and a black picture element region is a portion where black paint is painted. This embodiment is explained based on a case where information is printed on a white paper sheet with black ink (in monochrome), but the invention is not limited to this, and the invention cal also be applied to a case where information is printed in color (in multiple colors).

The input image 101 is data including font information and layout information, and is prepared by word processing software. The input image 101 is a white and black binary image for example, a white photograph image (picture element of a value 1) is a background on an image, and a black picture element (picture element of value 0) is a character region (region where ink is painted), but the invention is not limited to this example.

(Operation of the Watermarked Information Embedding Apparatus)

Figure 4:
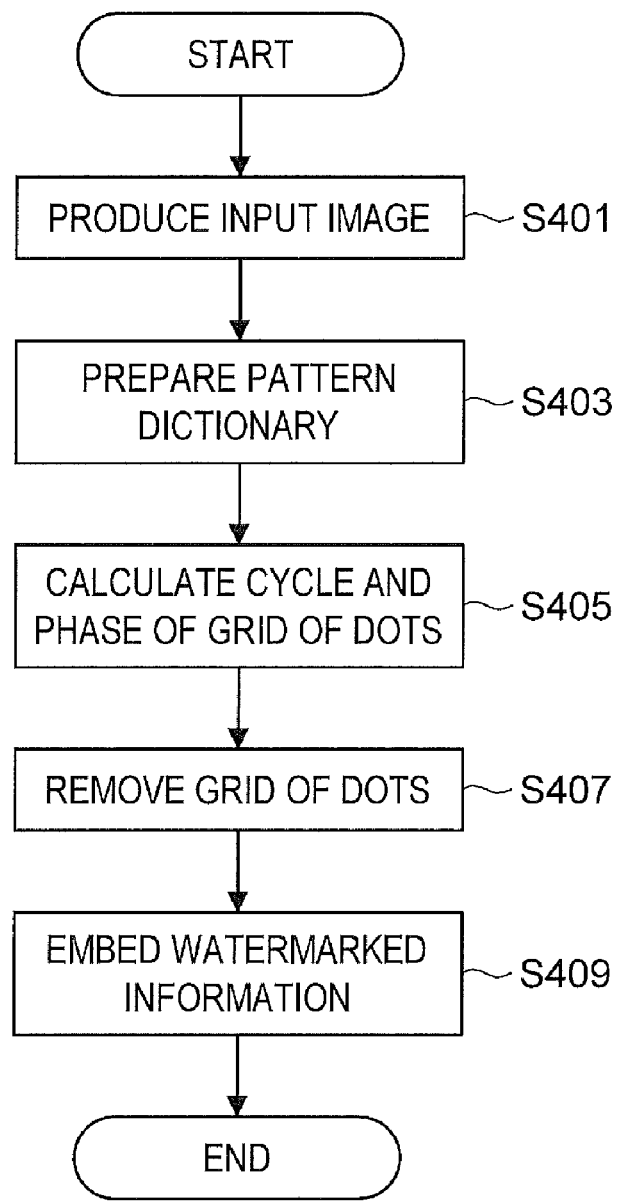
FIG. 4 is a flowchart showing an outline of a series of operations for embedding watermarked information in the input image of the first embodiment.

Next, a series of operations of the watermarked information embedding apparatus 100 according to the first embodiment will be explained with reference to FIGS. 4 to 10. FIG. 4 is a flowchart showing an outline of the series of operations for embedding watermarked information in the input image of the first embodiment.

As shown in FIG. 4, the watermarked information embedding apparatus 100 inputs a printed matter on which document or shaded image are printed using an input device (not shown) such as a scanner, and reads printed image which is previously stored in a storing device (not shown) such as a hard disk, thereby generating the input image 101 (S401).

Next, if the grid of dots detector 301 of the background removing section 201 inputs the input image 101, the grid of dots detector 301 scans the input image 101 thoroughly sequentially, determines an aggregation of black picture elements having predetermined size or smaller size as candidacies of points of the shaded image, i.e., points constituting the shaded image (grid of dots, hereinafter), stores the shape and position of the grid of dots, and prepares a pattern dictionary (S403).

The pattern dictionary is a group of coordinates in which grid of dots aggregate on the bases of shapes of the grid of dots. That is, shapes of the grid of dots and coordinates of the grid of dots having that shape can be associated in a one-to-one relation or in a one-to-many relation.

As described above, the grid of dots comprises an aggregation of black picture elements of several picture elements× several picture elements. For example, a circumscribed rectangular which circumscribes aggregation of the black picture elements is within an 8 picture elements×8 picture elements, but the invention is not limited to this example.

Figure 5:
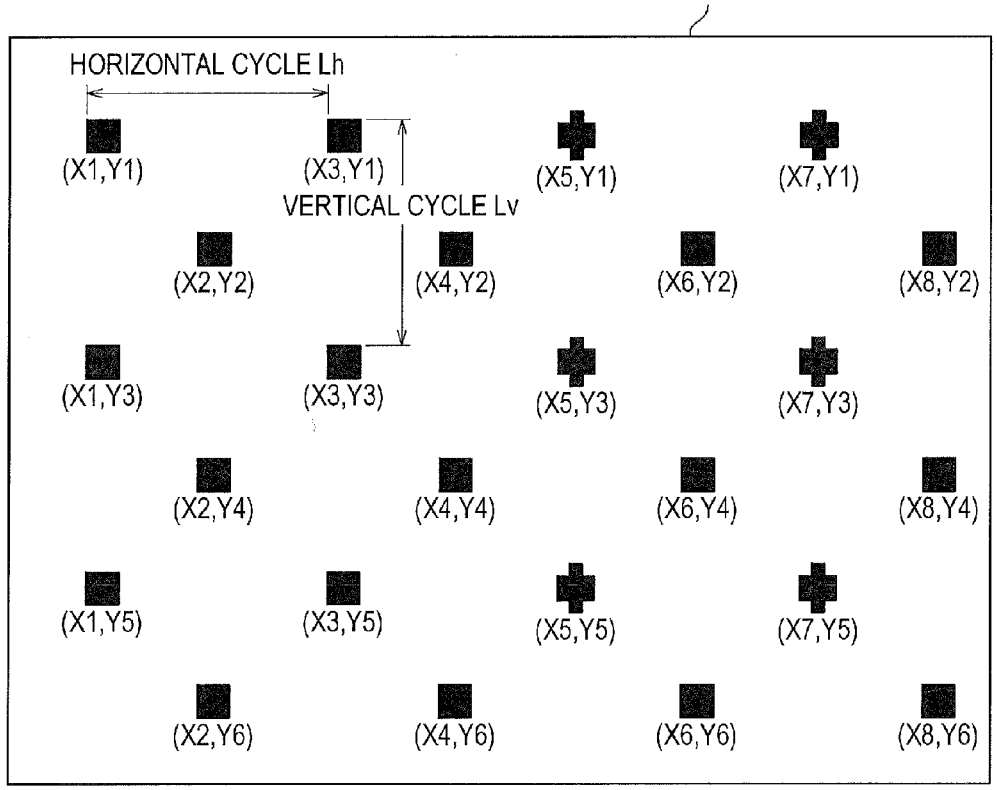
FIG. 5 is an explanatory diagram schematically showing a preparing operation of a pattern dictionary of the first embodiment.

As shown in FIG. 5, the grid of dots detector 301 scans the input image 101 in the vertical direction and the lateral direction in this order, and detects grid of dots 191 from the input image 101.

If the grid of dots detector 301 detects the grid of dots 191, the grid of dots detector 301 stores the shape and the position of the detected grid of dots. FIG. 5 shows two kinds of grid of dots 191, i.e., square and cross shaped grid of dots 191, but the invention is not limited to this, and the number of kinds may be one, two or more, or several hundred kinds.

The shape of the grid of dots 191 stored in the pattern dictionary of the first embodiment may previously be coded so that the grid of dots 191 can be identified on the shape basis and the code numbers may be stored in the pattern dictionary 193, or the graphic data of the detected grid of dots 191 may be stored in the pattern dictionary 193 as it is.

Coordinates showing the position of the grid of dots 193 of the first embodiment can exemplify coordinates of the left and upper corner of the grid of dots 193 or coordinates of fulcrum of the grid of dots 193, but the invention is not limited to this.

The grid of dots detector 301 repeatedly executes the detecting processing of the grid of dots 191 until scanning of the entire image region of the input image 101 is completed.

Concerning an aggregation of fine black picture elements which are not detected as candidacies of the grid of dots by the grid of dots detector 301 and which are smaller than the predetermined size, its shape and coordinates are stored in the pattern dictionary 193. Therefore, it is possible to remove the aggregation of such black picture elements and to filter. That is, if the grid of dots 191 is detected by the grid of dots detector 301, only the grid of dots 191 can be removed from the input image 191, the background image can be removed, and the efficiency of the removing operation of the background image can be enhanced.

As shown in FIG. 4, if the detection of the grid of dots by the grid of dots of dots detector is completed, the cycle/phase of grid of dots detector 302 obtains the positional relation of the grid of dots on the basis of the shape of the grid of dots stored in the pattern dictionary 193 (S405).

The cycle/phase of grid of dots detector 302 calculates all of the cycles and phases on the basis of the detected grid of dots, and renews the pattern dictionary 193 or stores the calculated cycles and phases in the pattern dictionary 193, thereby obtaining the positional relation of the grid of dots.

The cycle (horizontal cycle, vertical cycle), is obtained by calculating a distance between a grid of dots and an adjacent grid of dots in the horizontal direction and the vertical direction based on coordinates of both the grids of dots.

More specifically, as shown in FIG. 5, concerning the horizontal cycle, a distance between the grid of dots 191 of the coordinates (X1, Y1) and a grid of dots 191 of coordinates (X3,Y1) which is adjacent to the former grid of dots 191 in the horizontal direction is calculated as a horizontal cycle Lh.

As shown n FIG. 5, concerning the vertical cycle, a distance between a grid of dots 191 of coordinates (X3, Y1) and a grid of dots 191 of coordinates (X3, Y) which is adjacent to the former grid of dots 191 in the vertical direction is calculated as Vertical cycle Lv.

A phase (horizontal phase, vertical phase), is the remainder when coordinates of the grid of dots is divided by a cycle (horizontal cycle, vertical cycle) obtained for a grid of dots. That is, the phase shows a degree of deviation of the grid of dots in a cycle. The following equation 1) is used for calculating the phase.

$$(Ph, Pv) = (Xn \bmod Lh, Ym \bmod Lv) \quad \text{(equation 1)}$$

Here, Ph represents the horizontal phase, Pv represents vertical phase, n and m represent positive integers, and a mod b represents a reminder obtained when a is divided by b.

From the equation 1, coordinates of a grid of dots constituting the same shaded images are obtained by the following equation 2 if n and m are positive integers.

$$(Xn, Ym) = (Hh \times n + Ph, Lv \times m + Pv) \quad \text{(equation 2)}$$

Therefore, for each of grids of dots, the grids of dots are classified based on shape, cycle and phase of the grid of dots, and coordinates of the grid of dots are stored. As shown in FIG. 6, in the classified pattern dictionary 193a, coordinates of each grid of dots are classified based on the shape, cycle and phase of the grid of dots and stored. FIG. 6 is an explanatory diagram showing one example of an outline structure of the pattern dictionary in a state in which a positional relation of a grid of dots of the first embodiment is obtained.

As shown in FIG. 5 for example, as a coordinate of grid of dots 191 in which the shape thereof is ■, the cycles are the horizontal cycle Lh and vertical cycle Lv, and the phases are horizontal phase Ph and vertical phase Pv, six coordinates grids of dots 191 (X1, Y1), (X3, Y1), (X1, Y3), (X3, Y3), (X1, Y5), (X3, Y5) are stored in the pattern dictionary 193a.

The cycle/phase of grid of dots detector 302 of the first embodiment is explained based on a case where cycle and phase between each grid of dots and a grid of dots which is adjacent to the former grid of dots in the horizontal direction and vertical direction, but the invention is not limited to this, and the invention can also be applied to a case where the cycle/phase of grid of dots detector 302 calculates cycle and phase between each grid of dots and a next grid of dots (every one grid of dots) which is adjacent to the former grit in the horizontal direction and vertical direction.

A grid of dots other than those whose cycle and phase of each grid of dots are obtained by the cycle/phase of grid of dots detector 302 and which are classified based on its shape, cycle and phase and stored in the pattern dictionary 193a, i.e., a grid of dots whose horizontal cycle and vertical cycle could not be calculated and which are isolated are determined as a grid of dots constituting a background image to be removed, and the grid of dots is removed. Therefore, like the detecting operation of the grid of dots, the removing efficiency of the background image is enhanced by this filtering.

If the calculation of the cycle and phase of the grid of dots by the cycle/phase of grid of dots detector 302 is completed (S405), the removing operation of a grid of dots by the grid of dots removing section 303 is executed as shown in FIG. 4, and the background image is removed (S407).

The grid of dots removing section 303 removes, from the input image 101, a grid of dots detected as the shaded image based on the pattern dictionary 193a which was prepared. In this removing operation, all of one or more picture elements are filled with a color with which a sentence can be read (when a character is black, the picture element is filled with white or the like) constituted by a grid of dots in unit of a grid of dots, but the invention is not limited to this.

Concerning a grid of dots which is partially or totally superposed with a character, the grid of dots removing section 303 determines whether the grid of dots is superposed with the character, and when the grid of dots is superposed with the character, the grid of dots removing section 303 executes a later-described processing to cope with this problem.

First, to determine whether the grid of dots is partially or totally superposed on the character, the grid of dots removing section 303 refers to the pattern dictionary 193a and specifies a position of a next grid of dots using the equation 2.

Next, the grid of dots removing section 303 determines whether the grid of dots belongs to a sentence region comprising one or more characters and signs existing in the input image 101 as to whether the position of the specified next grid of dots is partially included in the character. That is, a portion of the grid of dots belongs to the sentence region, it is possible to determine that the grid of dots is included in a portion of the character, and if all of the grid of dots belong to the sentence region (all of grid of dots is included in the sentence region), it is possible to determine that the grid of dots is included in the character.

Next, when the position of the specified grid of dots is partially superposed on a character, the grid of dots removing section 303 determines whether the grid of dots actually exists in that position. If the grid of dots does not exist in that position, it is determined that there are only black picture elements constituting the character and no grid of dots exists. When it is determined that the grid of dots actually exists in that position, i.e., when the position of the specified grid of dots is constituted by the black picture elements, the grid of dots removing section 303 determines that the grid of dots and character are superposed on each other, and the grid of dots removing section 303 delete the portion of the grid of dots such that the portion of the character is not deleted.

When the grid of dots removing section 303 determines that the position of all of the grid of dots is included in the character, the grid of dots removing section 303 determines that all of grid of dots is included in the character, and does not delete the grid of dots.

More specifically, as shown in FIG. 7, the grid of dots removing section 303 determines whether the position of a next grid of dots is partially or totally superposed on the character. FIG. 7 are explanatory diagrams schematically showing processing for determining whether the grid of dots of the first embodiment is partially or totally superposed on the character.

FIG. 7 show a case where the position of the grid of dots is partially superposed on the character. The grid of dots removing section 303 first refers to the pattern dictionary 193a and specifies a position of the grid of dots using the equation (2). The position of the specified grid of dots is a grid of dots position 791-1 or a grid of dots position 791-2 shown with broken lines. The grid of dots shown in FIG. 7 is an aggregation of black picture elements of 8 picture elements×8 picture elements for example, but the invention is not limited to this.

Next, the grid of dots removing section 303 calculates a degree of superposition between the specified grid of dots position 791 and a character region. Concerning the position and the size of the character region, only the character portion is recognized by character recognition when the input image 101 is previously generated, and it is stored in storing means such as a memory or a hard disk (HDD) as character region information, but the invention is not limited to this.

As shown in FIG. 7, the grid of dots removing section 303 determines that the grid of dots position 791 is superposed on the character region by about half.

Figure 7A:
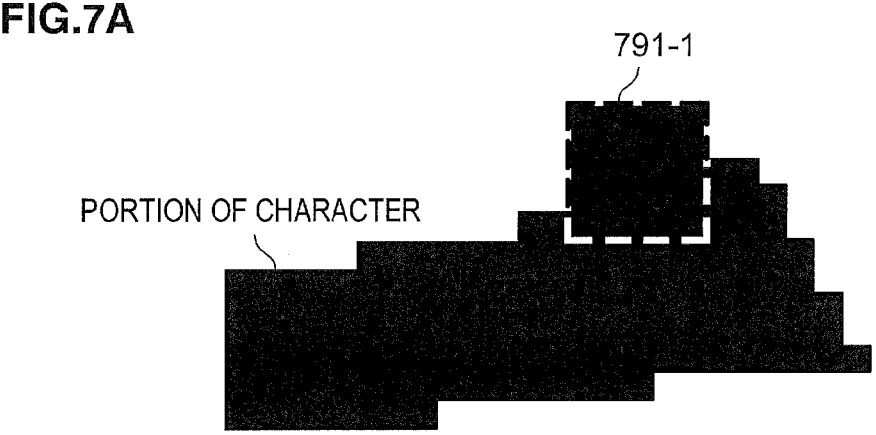
FIG. 7 are explanatory diagrams schematically showing processing for determining whether the grid of dots of the first embodiment is partially or totally superposed on characters.

The grid of dots removing section 303 determines whether the grid of dots actually exists in the specified grid of dots position 791. All of an area within the broken line of the grid of dots position 791-1 shown in FIG. 7A is constituted by black picture elements. Thus, the grid of dots removing section 303 determines that there exits a grid of dots which is partially superposed on the character, and deletes the portion of the grid of dots while remaining the portion of the character to the maximum level. Details of this will be described later.

Figure 7B:
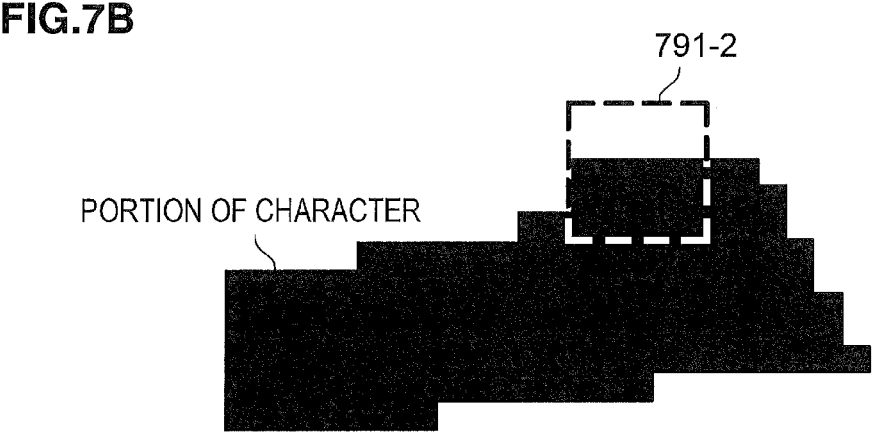

A portion of an area within the broken line of the grid of dots position 791-2 shown in FIG. 7B is constituted by blank and only a remaining character portion is constituted by black picture elements. Therefore, the grid of dots removing section 303 determines that no grid of dots exists in the grid of dots position 791-2, and does not delete the grid of dots.

Although it is not illustrated in FIG. 7, also when the broken line showing the grid of dots position 791 is totally included in the character region, since a portion of the black character is deleted by white color by deleting the grid of dots, the grid of dots removing section 303 does not delete the grid of dots like the case shown in FIG. 7B.

Next, when the grid of dots removing section 303 deletes a grid of dots which is partially superposed on the character, As shown in FIG. 7A, the outline of the character is deformed by deleting the grid of dots, but the grid of dots removing section 303 carries out a straight complementing operation from the outline of the character around the grid of dots, and it is possible to correct the character to a state which is extremely close to a state of a character before grid of dots is superposed thereon.

Here, the removing processing of the grid of dots which is partially superposed on the character by the grid of dots removing section 303 will be explained with reference to FIG. 8. FIG. 8 are explanatory diagrams for showing an outline of processing for deleting the grid of dots which is partially superposed on character of the first embodiment. The grid of dots shown in FIG. 8 is an aggregation of black picture elements of 8 picture elements×8 picture elements, but the invention is not limited to this.

Figure 8A:
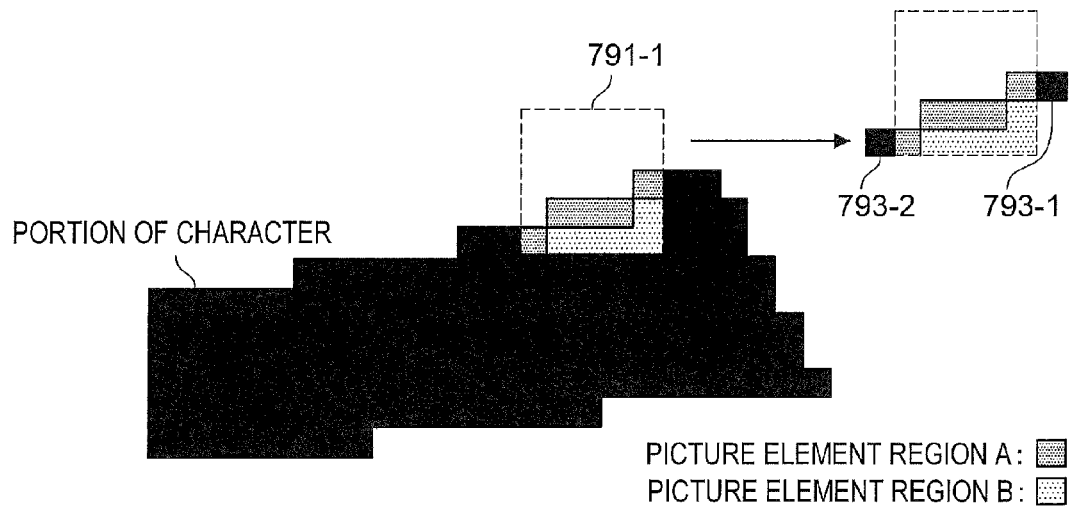
FIG. 8 are explanatory diagrams for showing an outline of processing for deleting the grid of dots which is partially superposed on character of the first embodiment.

As shown in FIG. 8A, the grid of dots removing section 303 fills all of the black picture elements existing in the grid of dots position 791 with white and then, the grid of dots removing section 303 returns a picture element region (picture element region A shown in FIG. 8A) on a straight line connecting a black picture element 793-1 and a black picture element 793-2 in the character which is in contact with the grid of dots position 791 to the black picture element 793, and returns a picture element region (picture element region B shown in FIG. 8A) existing closer to the character than the straight line to a black picture element 793. From above, the grid of dots removing section 303 can correct the deformation of an outline of a character by removing the grid of dots.

Figure 8B:
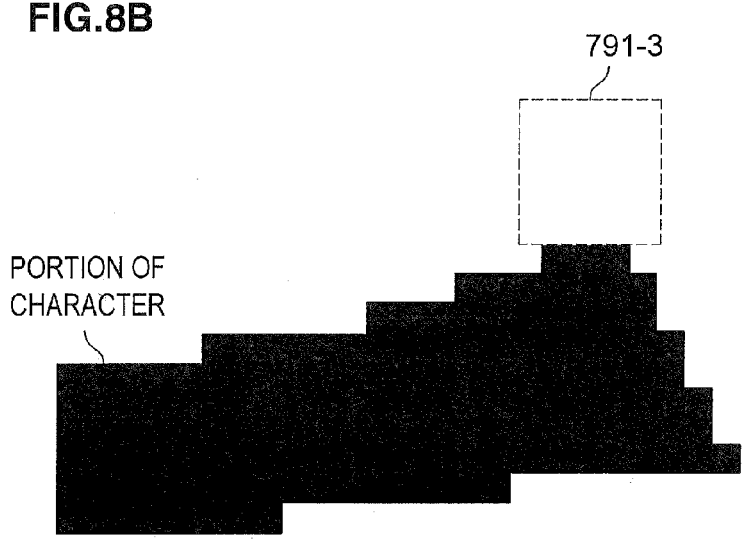

As shown in FIG. 8B, when a grid of dots position 791-3 exists on a position where one of broken lines of the grid of dots position 791-3 is in contact with an outline of the character, the grid of dots removing section 303 can fill all of the black picture elements existing in the grid of dots position 791-3 with white, and it is unnecessary to execute the correction processing such as straight line complementing processing.

If step S407 shown in FIG. 4 is completed, the grid of dots removing section 303 deletes the grid of dots constituting the background image of the input image 101, and can output a background-deleted image 203 in which the character and the ruled line remain.

Figure 9:
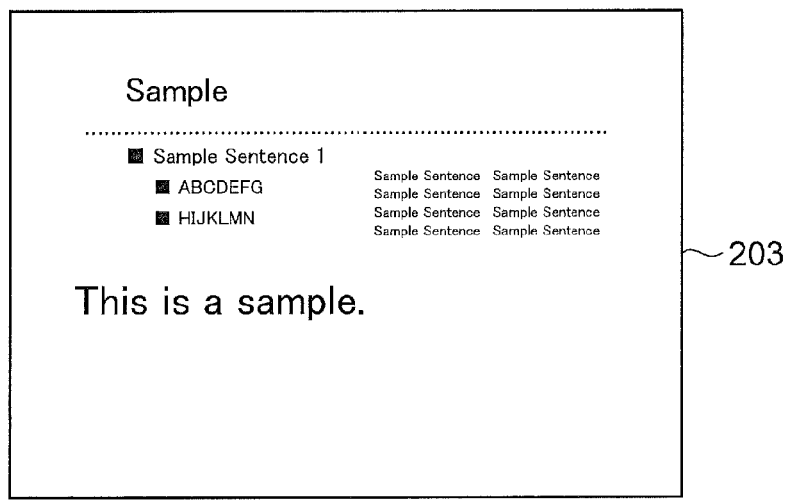
FIG. 9 is an explanatory diagram showing an outline of processing for estimating a position of a grid of dots and for determining presence or absence of the grid of dots of the first embodiment.

As shown in FIG. 9, it can be found that grid of dots is deleted from the background-deleted image 203 and only the ruled line and an image of sentence exist. Watermarked information is embedded in the background-deleted image 203, and the image having watermarked information 121 is output.

Next, as shown in FIG. 4, the watermarking generator 202 inputs the input information 111 which is arbitrary information to be embedded, encodes the same into watermarked information, embeds the watermarked information in the background-deleted image 203 which is output from the background removing section 201, and outputs the image having watermarked information 121 (S409).

The embedding processing of watermarked information by the watermarking generator 202 is substantially the same as that of the watermarked information described in Japanese Patent No. 3628312. The structure or function of the watermarking generator 202 is substantially the same as a watermarked image forming section 12, a watermarked document image synthesizing section 13, and an output device 14 of Japanese Patent No. 3628312 (corresponding to U.S. Pat. No. 7,085,399).

The watermarked image forming section 12 performs N-ary coding (N is two or higher) on a value obtained by digitalizing secret information (corresponding to the input information 111) and converted into a numeric value, and allocates symbols of codewords to a previously prepared signal. The signal indicates a wave having arbitrary direction and wavelength by arranging dots in a rectangular region having arbitrary size, and allocates a symbol to the direction of the wave and the wavelength. These signals are disposed on an image in accordance with a certain rule.

A document image having watermarked information synthesizing section 13 superposes a document image (corresponding to the background-deleted image 203) and a watermarked image on each other, and prepares a document image having document image having watermarked information. An output device 14 is an output apparatus such as a printer, and prints document image having watermarked information on a paper medium. Therefore, the watermarked image forming section 12 and the document image having watermarked information synthesizing section 13 may be realized as one function of a printer driver.

The processing flow of encoding the secret information (corresponding to the input information 111) as the watermarked information will be explained below briefly.

Like Japanese Patent No. 3628312, secret information 16 is converted into N-ary code (step S101). Here, N is arbitrary. In this embodiment, N is defined as 2 to make the explanation easy.

Next, a watermarked signal is allocated to each symbol of codewords (step S102). The watermarked signal expresses a wave having arbitrary wavelength and direction by array of dots (black picture elements).

A signal unit corresponding to a bit array of encoded data on the watermarked image, the secret information can be converted into the watermarked information (step S103).

In this manner, information as to which watermarked signal is allocated to which symbol can be held in confidence so that a third party (outsider) can not easily decipher the embedded signal.

Next, the same symbol unit is repeatedly embedded. This is because when a character in a sentence is superposed on an embedded symbol unit, a case where it is not detected when a signal is detected is avoided. Then number of repetitions of the symbol unit and the pattern of disposition (unit pattern, hereinafter) are arbitrary.

Japanese Patent No. 3628312 describes a method for embedding the input information 111 into the watermarked image (watermarked information). The method will be explained below.

First, secret information 16 (corresponding to input information 111) is converted into N-ary symbol (step S201). This is the same as step S101. Hereinafter, encoded data is called data code, and data code expressed by a combination of unit pattern is called data code unit Du.

Next, the computer calculates as to how many times the data code unit can be embedded in one image from the code length of the data code (here, the number of bits) and the number of embedded bits (step S202). In this embodiment, code length data of the data code is inserted in the first line of unit pattern matrix. The code length of the data code is defined as fixed length, and code length data may not be embedded in the watermarked image.

Next, the code length data is embedded in the first line of the unit pattern matrix (step S203).

The data code unit is repeatedly embedded in second and subsequent lines of the unit pattern matrix (step S204). Here, most significant bit (MSB) of the data code or least significant bit (LSB) of the data code is embedded in the direction of the like.

Data may be embedded which that the data sets are continuous in the line direction or array direction.

The watermarking generator 202 superposes the background-deleted image 203 and the prepared watermarked image (watermarked information) on each other. As described in Japanese Patent No. 3628312, a value of each picture element of the document image having watermarked information (corresponding to the image having watermarked information 121) is calculated by AND computation of the document image (corresponding to the background-deleted image 203) and the picture element value corresponding to the watermarked image. That is, if any of the document image and watermarked image is 0 (black), the picture element value of the document image having watermarked information is 0 (black), and otherwise 1 (white).

Figure 10:
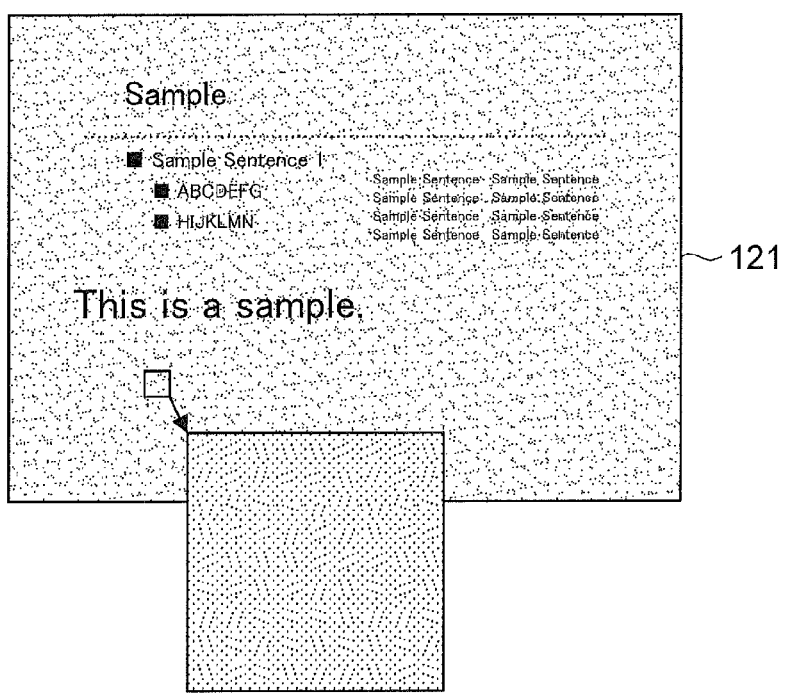
FIG. 10 is an explanatory diagram showing an outline of processing for deleting a grid of dots when the grid of dots and character of the first embodiment are superposed on each other.

As explained above, if the watermarked information is embedded in the background-deleted image 203 by the watermarking generator 202, the image having watermarked information 121 is prepared. As shown in FIG. 10, it can be found that the image having watermarked information 121 is expressed such that the watermarked image is expressed in the form of tint block on the background of image such as a sentence.

The image having watermarked information 121 may be printed on a paper medium by a printer, or may be utilized on an information processing apparatus such as a personal computer in a form of a file such as PDF or TIFF.

The explanation of the watermarked information embedding apparatus 100 of the first embodiment is completed. Even when photograph or shaded image exists by the watermarked information embedding apparatus 100 together with the input image 101, there is effect that background image such as photograph image or shaded image is removed, and watermarked information can be embedded in the input image 101 so that the watermarked information can precisely be read.

Second Embodiment

Next, a watermarked information embedding apparatus 100a of the second embodiment will be explained. In the explanation of the watermarked information embedding apparatus 100a, the watermarked information embedding apparatus 100a of the second embodiment and the watermarked information embedding apparatus 100 of the first embodiment are compared with each other, and a difference therebetween will be explained. Explanation of substantially the same portion will be omitted.

Figure 11:
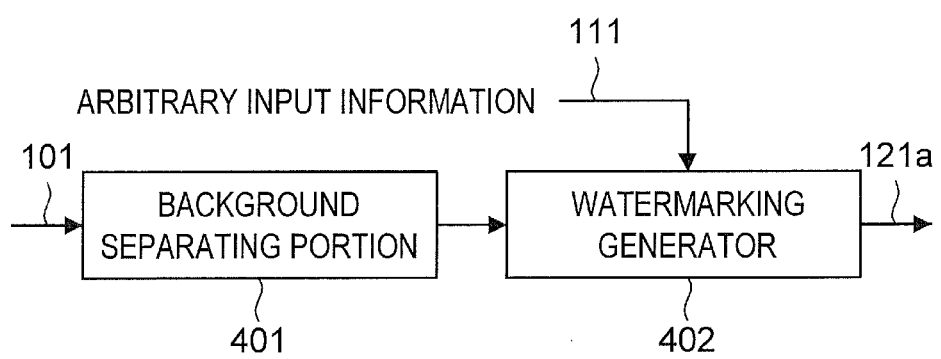
FIG. 11 is a block diagram showing an outline structure of a watermarked information embedding apparatus of a second embodiment.

Next, the watermarked information embedding apparatus 100a of the second embodiment will be explained with reference to FIG. 11. FIG. 11 is a block diagram showing an outline structure of the watermarked information embedding apparatus of the second embodiment.

As shown in FIG. 11, the watermarked information embedding apparatus 100 includes a background separating portion 401 which separates a background image 207 such as a shaded image or a photograph image and a document image (background-deleted image) 203 representing a character or ruled line based on the input image 101 which is input from outside. The watermarked information embedding apparatus 100 also includes a watermarking generator 402 which produces image having watermarked information 121a based on the background-deleted image 203, the background image 207 and arbitrary input information 111 which is to be embedded as the watermarked information.

Figure 12:
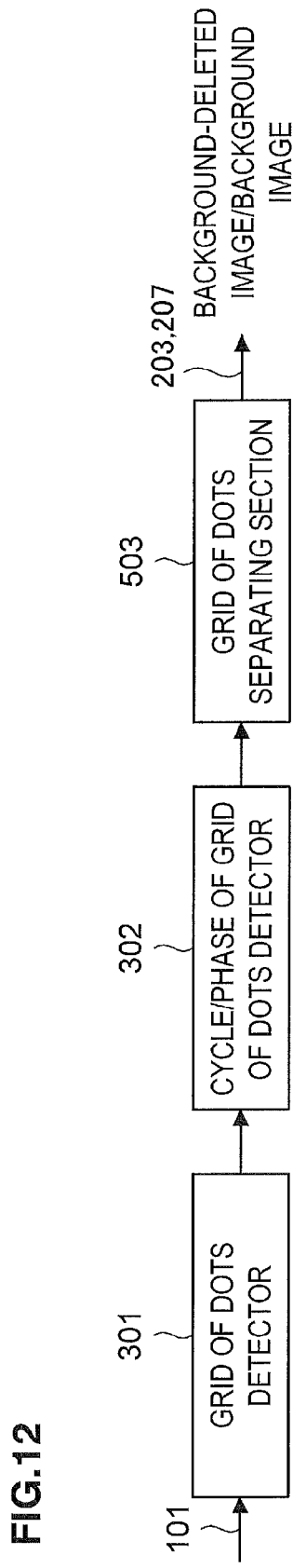
FIG. 12 is a block diagram showing one example of an outline structure of a background separating portion of the second embodiment.

Next, the background separating portion 401 will be explained in detail with reference to FIG. 12. FIG. 12 is a block diagram showing one example of an outline structure of the background separating portion of the second embodiment.

As shown in FIG. 12, the background separating portion 401 separates a background-deleted image 203 corresponding to the document image having a character, a sign, a ruled line or the like, and a background image 207 such as a shaded image or photograph image from the input image 101, and outputs the same. The background separating portion 401 includes a grid of dots detector 301, a cycle/phase of grid of dots detector 302 and a grid of dots separating section 503.

(Operation of Watermarked Information Embedding Apparatus)

Next, a series of operations of the watermarked information embedding apparatus 100a of the second embodiment will be explained. In the explanation of a series of operations of the watermarked information embedding apparatus 100a of the second embodiment, the series of operations of the watermarked information embedding apparatus 100a of the second embodiment and the series of operations of the watermarked information embedding apparatus 100 of the first embodiment are compared with each other, and a difference therebetween will be explained. Detailed explanation of substantially the same portion will be omitted.

The series of operations of the watermarked information embedding apparatus 101a of the second embodiment is different from the series of operations of the watermarked information embedding apparatus 101 of the first embodiment in that separating processing of grid of dots is carried out by the grid of dots separating section 503 in step S407, and the embedding processing of the watermarked information is carried out by the watermarking generator 503. Other portions are substantially the same.

Figure 13:
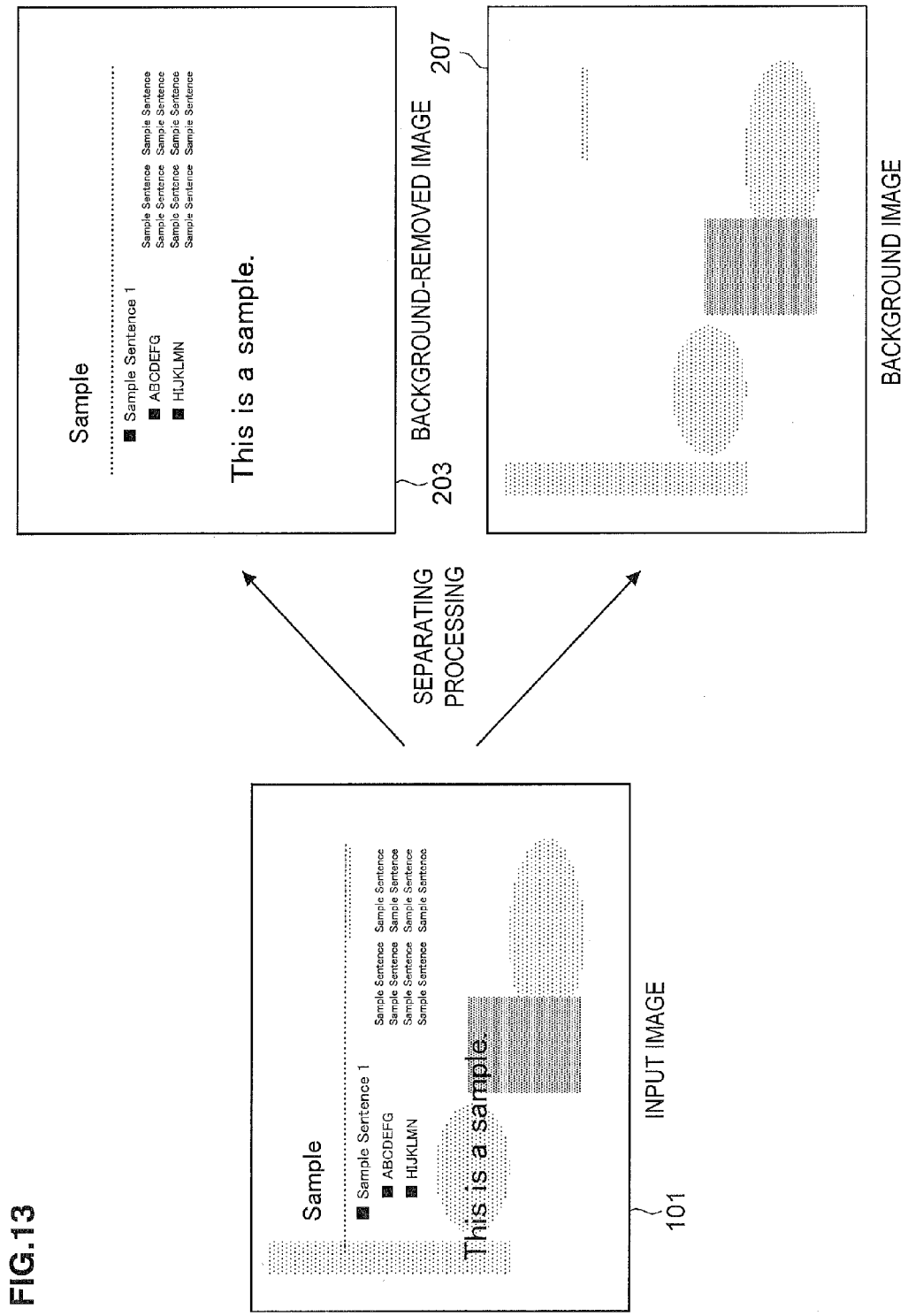
FIG. 13 is an explanatory diagram showing an outline of operation of the background separating portion of the second embodiment.

First, the operation of the background separating portion 401 of the second embodiment will be explained with reference to FIG. 13. FIG. 13 is an explanatory diagram showing an outline of operation of the background separating portion 401 of the second embodiment.

As shown in FIG. 13, the background separating portion 401 separates into a background-deleted image 203 which is an image representing a character, a sign, a ruled line and the like and a background image 207 such as a shaded image or photograph image based on the input image 101 to be input.

The grid of dots detector 301 and the cycle/phase of grid of dots detector 302 of the background separating portion 401 are substantially the same as the grid of dots detector 301 and the cycle/phase of grid of dots detector 302 of the first embodiment. Thus, detailed explanation is omitted, and the grid of dots separating section 503 will be explained.

The grid of dots separating section 503 deletes a grid of dots 191 detected as a grid of dots constituting the shaded image (background image) from the input image 101, and plots and renders the grid of dots 191 deleted as the background image on an image region of the background image 207.

Sizes of image regions of the input image 101, the background-deleted image 203 and the background image 207 are the same, a pair of positions of the grid of dots 191 deleted by the input image 101 and a pair of positions of the image regions on which the grid of dots 191 is rendered on the background image 207 are the same.

The processing for deleting the grid of dots 191 from the input image 101 is processing for filling the entire picture elements constituting the grid of dots 191 in unit of grid of dots with background color such as white, and processing for rendering the grid of dots 191 on the background image 207 is processing for filling the entire picture elements constituting the grid of dots 191 in unit of grid of dots with black, but they are not limited to such processing.

When the grid of dots 191 is partially or totally superposed on the character, the grid of dots separating section 503 can specify the position of the grid of dots 191 using the equation 2 from cycle and phase like the first embodiment.

When black picture elements exists in a position of a specified grid of dots 191 by an amount of black picture elements constituting grid of dots, the grid of dots separating section 503 determines that the grid of dots 191 is superposed on a character partially. When all of the position of the specified grid of dots 191 is included in the character region, the grid of dots separating section 503 determines that all of the grid of dots 191 is superposed on the character, and the grid of dots separating section 503 does not delete the grid of dots.

Figure 14:
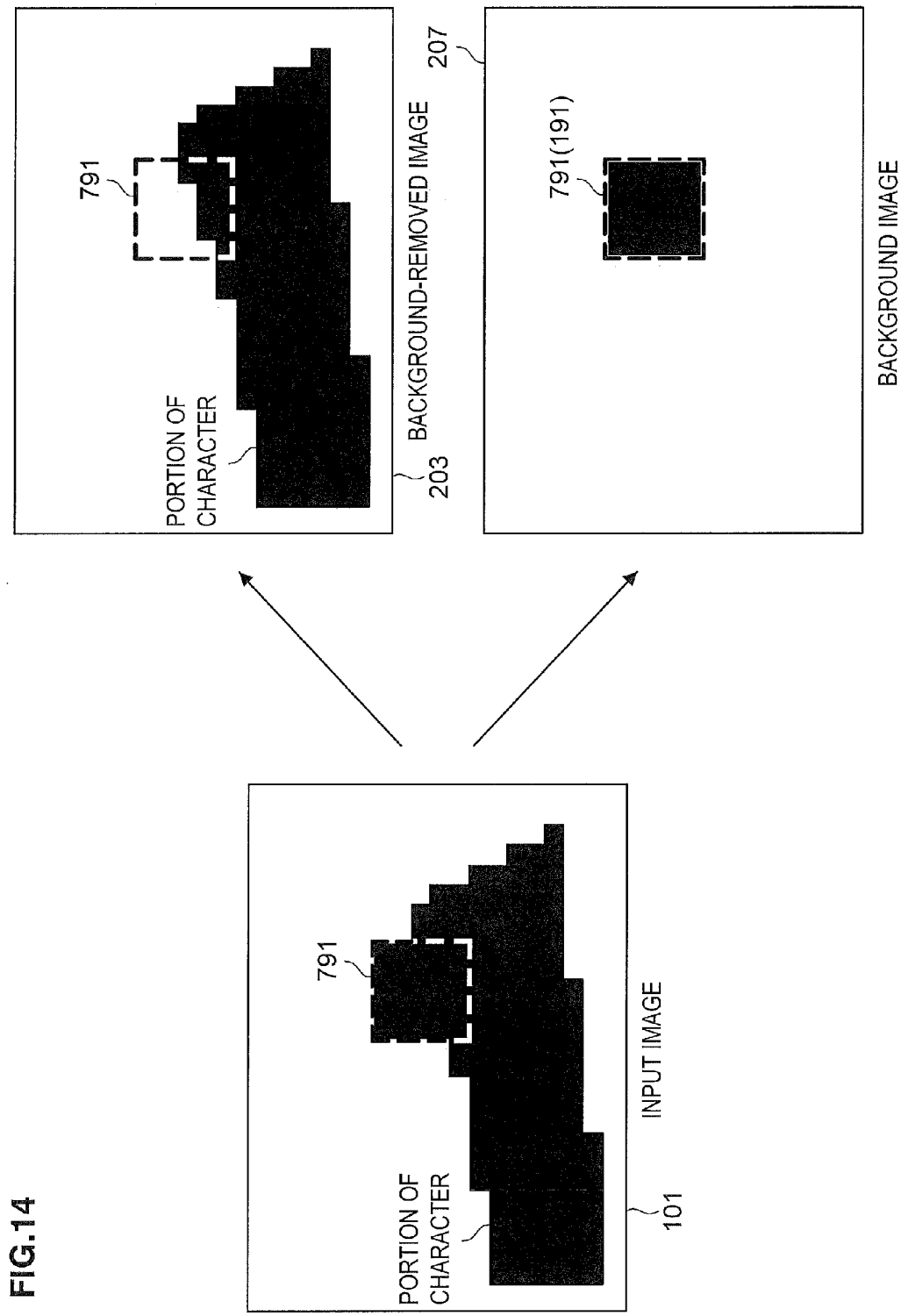
FIG. 14 is an explanatory diagram showing an outline of operation of processing for dividing input images by the background separating portion of the second embodiment into background-deleted image and background image.

As shown in FIG. 14, concerning the grid of dots 191 which is superposed on the character partially, the grid of dots separating section 503 deletes the same from the input image 101 and prepares the background-deleted image 203, renders the entire grid of dots 191 which is partially superposed on the character on an image region of the background image 207, and prepares the background image. The processing of the grid of dots separating section 503 for deleting the grid of dots 191 which is superposed on the character is substantially the same as that carried out by the grid of dots removing section 303 and thus, detailed explanation thereof will be omitted.

If the grid of dots separating section 503 deletes all of grids of dots 191 from the input image 101, and renders all of grids of dots 191 on the image region of the background image 207, the grid of dots separating section 503 outputs the background-deleted image 203 and the background image 207.

With the above processing, the background-deleted image 203 and the background image 207 are output from the grid of dots separating section 503 as shown in FIG. 13.

Figure 15:
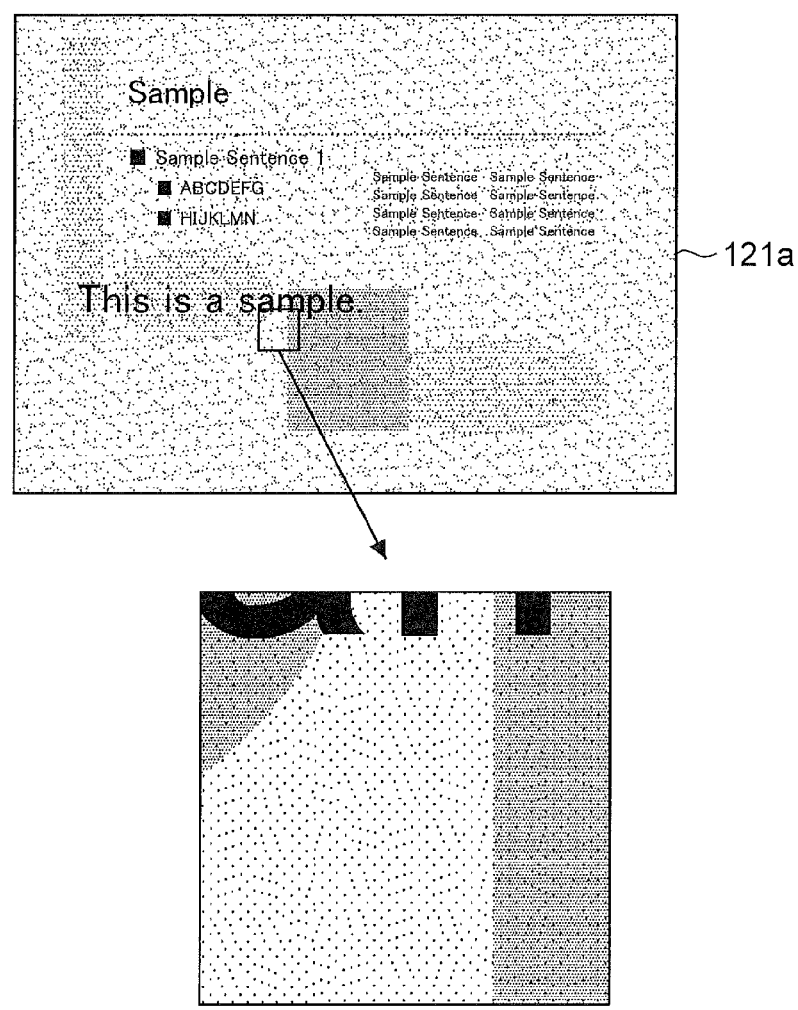
FIG. 15 is an explanatory diagram showing an outline structure of image having watermarked information of the second embodiment.
Figure 16:
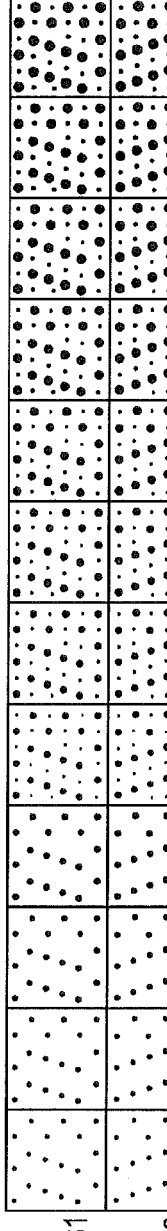
FIG. 16 is an explanatory diagram showing an outline structure a unit pattern in accordance with picture element density of the second embodiment.
Figure 17:
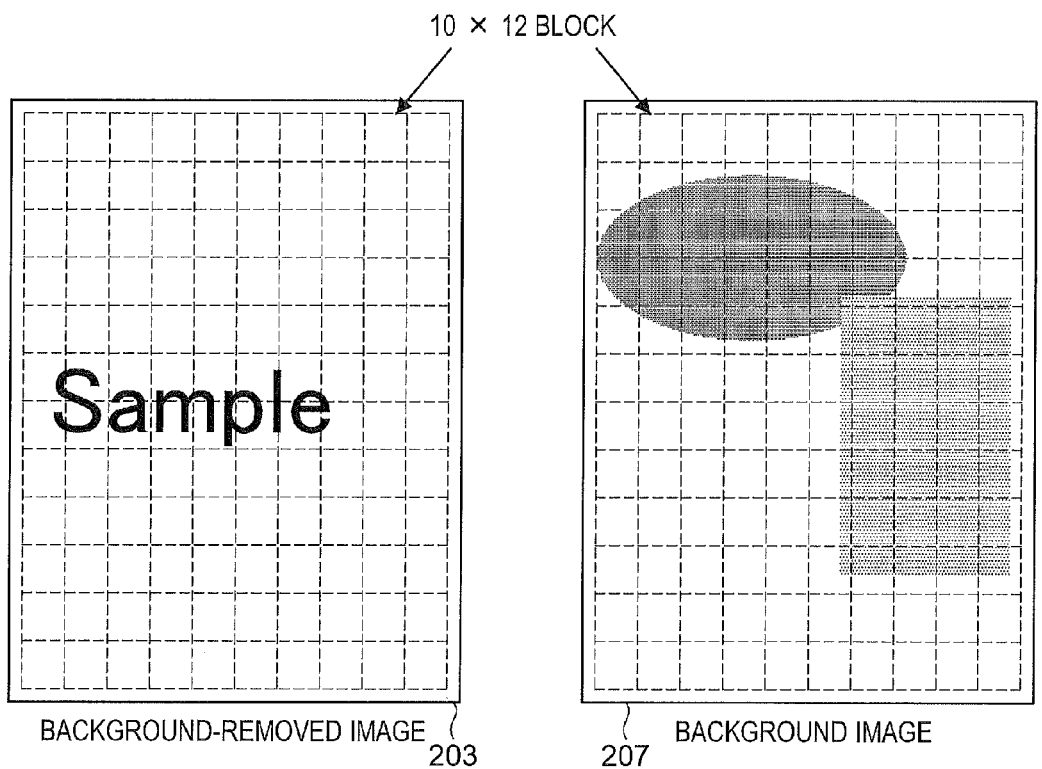
FIG. 17 is an explanatory diagram showing an outline of processing for embedding a unit pattern as watermarked information of the second embodiment.

Next, the processing for embedding watermarked information by the watermarking generator 402 of the second embodiment will be explained with reference to FIGS. 15 to 17. FIG. 15 is an explanatory diagram showing an outline structure of image having watermarked information of the second embodiment. FIG. 16 is an explanatory diagram showing an outline structure a unit pattern in accordance with picture element density of the second embodiment. FIG. 17 is an explanatory diagram showing an outline of processing for embedding a unit pattern as watermarked information of the second embodiment.

The watermarking generator 402 inputs input information 111 which is arbitrary information to be embedded, encodes the watermarked information, embeds the watermarked information in the background-deleted image 203 which is output from the background separating portion 401 based on the background image 207, and outputs the image having watermarked information 121a.

As shown in FIGS. 16 and 17, the watermarking generator 402 divides the background image 207 into a plurality of blocks, determines density of picture elements of the watermarked unit pattern with respect to the block of the image having watermarked information 102a corresponding to that block based on the density distribution of the picture elements of each block, and embeds the same in the block of the image having watermarked information 102a. The invention is not limited to this example, and the unit pattern may be determined based on the density of the picture elements and/or tone of the picture element.

More specifically, as shown in FIG. 17 for example, when one unit pattern is constituted by a block of 36×36 picture elements, the density of the picture elements of the unit pattern can be changed in accordance with a size of the dot diameter to be rendered in the unit pattern as shown in FIG. 16. The invention is not limited to this, and the density of the picture elements of the unit pattern can be enhanced by complementarily disposing the picture elements between a dot and a dot rendered in the unit pattern.

At that time, as shown in FIG. 16, it is possible to previously design the unit pattern in which dots are disposed such that the signal component of the unit pattern is not deteriorated as small as possible, and to selectively use the unit pattern in accordance with density of the picture elements of the background image 207.

Therefore, the watermarking generator 402 divides the image region of the background-deleted image 203 and the background image 207 into the same plurality of blocks, and the watermarking generator 402 calculates the density of the picture elements in each block of the divided background image 207. With this, a unit pattern which corresponds to the density of the obtained picture elements and which corresponds to a code to be embedded as the watermarked information is selected from a unit pattern table shown in FIG. 16, and embeds the unit pattern in the block of the background-deleted image 203 corresponding to the block of the background image 207.

That is, the watermarked information is embedded in the background-deleted image 203 such that a tint block as watermarked information near the shaded image is expressed densely and the tone and the like are varied based on the density of the picture element of the background image 207. Therefore, the image having watermarked information 102a to be output becomes an image in which the background image 207 and the background-deleted image 203 are expressed and the watermarked information is embedded.

Except the above point, the embedding processing of the watermarked information of the watermarking generator 402 according to the second embodiment is substantially the same as the embedding processing of the watermarked information of the watermarking generator 202 of the first embodiment and thus, detailed explanation thereof will be omitted.

From the above description, if the watermarking generator 402 embeds the watermarked information in the background-deleted image 203, as shown in FIG. 15, the watermarking generator 402 can output the image having watermarked information 102a in which the background image 207 and the background-deleted image 203 are integrally formed and the watermarked information is embedded in an image which is extremely close to the input image 101.

The explanation of the watermarked information embedding apparatus 101a of the second embodiment is completed. The watermarked information embedding apparatus 101a has the following excellent effects.

(1) It is possible to embed watermarked information so that even when a shaded image or photograph image is included in the input image 101, the watermarked information can precisely be read. It is possible to record the image having watermarked information 102a in a recording medium as a document file, and to print the same as a printed matter.

(2) It is possible to render a portion of a background image such as a shaded image such as to express with dots by the unit pattern by embedding the watermarked information in the background-deleted image 203 in accordance with density (density of picture element) of the background image 207, and it is possible to enhance the reproducibility of the image having watermarked information 102a, and to bring the outward appearance of the image having watermarked information 102a close to the outward appearance of the input image 101. Further, a sense of disharmony of a user can be reduced.

Figure 18:
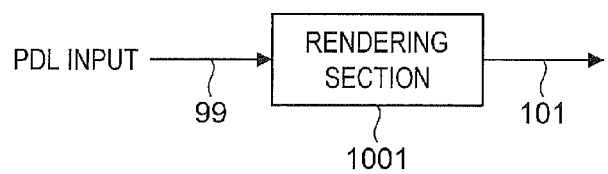
FIG. 18 is a block diagram showing an outline structure of a rendering portion of the second embodiment.
Figure 19:
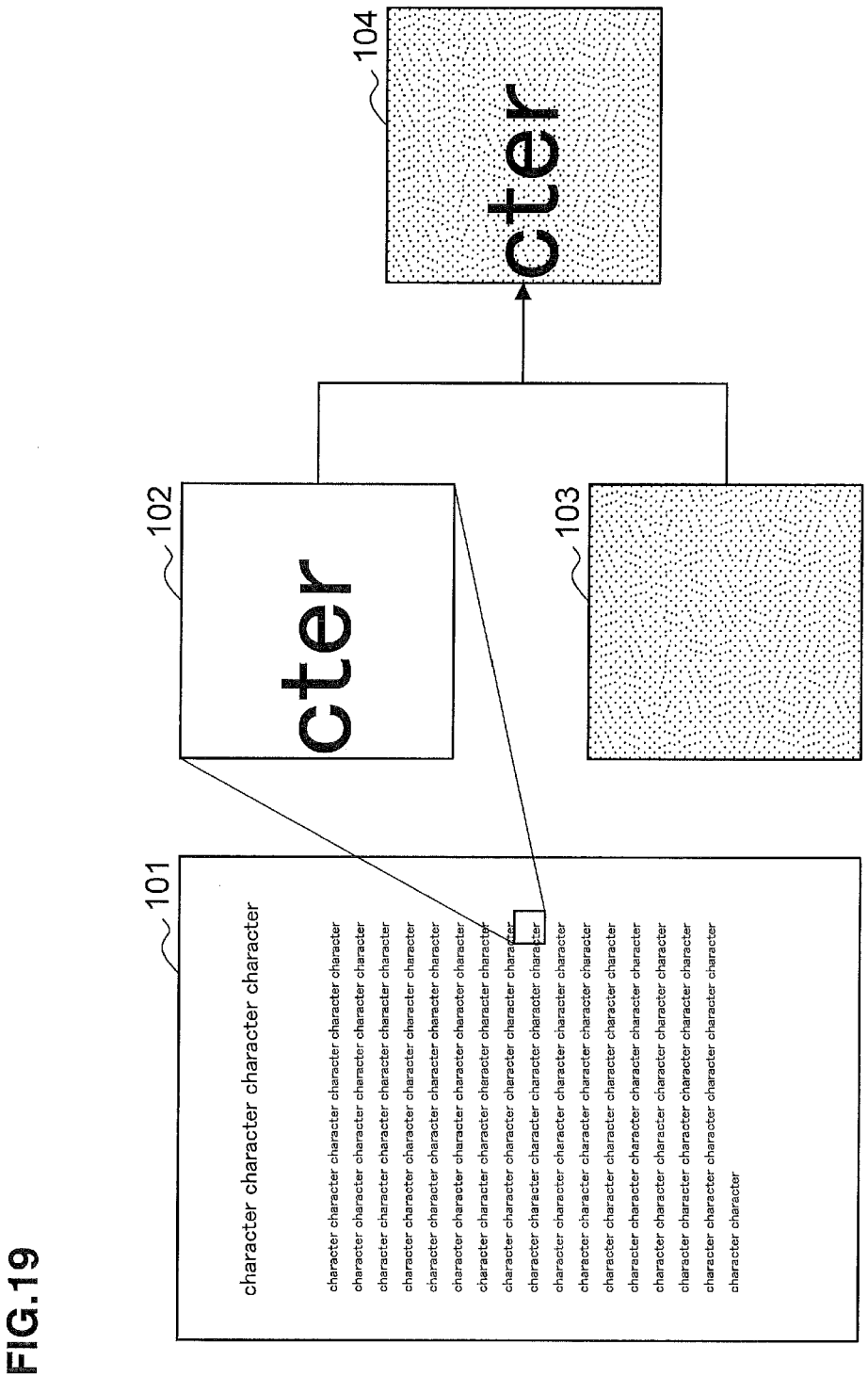
FIG. 19 is an explanatory diagram showing an outline of processing for embedding watermarked information of a conventional technique.

When input data is constituted by page description language (PDL) such as Postscript as front stage of the input image 101, as shown in FIG. 18, it can be input to the background removing section 201 of the first embodiment or the background separating portion 401 of the second embodiment through a rendering portion 1001 which converts PDL 99 into two value image.

The above-described series of processing can be carried out by special hardware or software. When the series of processing is carried out by software, a program constituting the software is installed in a computer (including microcomputer) such as a general printer, and the computer functions as a watermarked information embedding apparatus 100.

The program can previously be stored in a hard disk as a recording medium incorporated in the computer or a memory such as a ROM.

The program can be temporarily or permanently stored in a removable recording medium a flexible disk, a Compact Disc Read Only Memory (CD-ROM), Magneto Optical (MO) disk, Digital Versatile Disc (DVD), magnetic disk, semiconductor memory or the like, other than the hard disk. Such a removable recording medium can be provided as so-called package software.

The program can be installed in a computer from the removable recording medium or can be transferred to the computer without line through an artificial satellite for digital satellite broadcasting from a download site, or transferred to the computer through a line via a network such as Local Area Network (LAN), the Internet or the like, and can be installed in a memory or a hard disk having a program which is transferred in this manner.

In this specification, it is unnecessary that processing steps in which program for allowing a computer to execute the various processing are carried out in time sequence in the order described in the flowchart, and the processing step includes processing which is carried out in parallel or individually (e.g., parallel processing or processing by object).

The program may be executed by one computer or may be carried out by a plurality of computer in a distributed manner.

Although preferred embodiments of the present invention have been explained with reference to the accompanying drawings, the present invention is not limited to these examples. A person skilled in the art can obviously achieve various modifications or corrections, and these modifications and corrections are included in the technical scope of the present invention.

In the embodiments, a grid of dots is a point which constitutes a shaded image, the shaded image is removed as a background image, and the background-deleted image 203 is prepared, but the invention is not limited to this example. For example, a background image such as a photograph image or illustration image can also be carried out like the shaded image.

In the embodiments, the grid of dots is a point which constitutes a shaded image, the shaded image is handled as the background image and is separated into the background-deleted image 203 and the background image 207 from the input image 101, but the invention is not limited to this. The background image such as the photograph image and illustration image can also be carried out like the shaded image.

In the embodiments, various portions of the watermarked information embedding apparatus 101 or the watermarked information embedding apparatus 101*a* comprise hardware, but the present invention is not limited to this example. The various portions may be a program constituted by one or more modules or components.

The present invention can be applied to a watermarked information embedding apparatus which embeds watermarked information in a text data.

What is claimed is:

1. A watermarked information embedding apparatus which inputs an image having picture elements and embeds watermarked information in the input image, comprising:
    picture element determining means which determines whether it is a picture element constituting part of a background image for each of the picture elements which constitute the input image;
    background picture element removing means which removes all of background picture elements determined as picture elements constituting the background image by the picture element determining means; and
    watermarked information embedding means which embeds the watermarked information in an image constituted by picture elements from which the background picture elements have been removed by the background picture element removing means,
    wherein an aggregation of picture elements which constitute the input image forms dots,
    wherein the picture element determining means classifies picture elements constituting dots smaller than a predetermined size as picture elements which are to be removed as candidates for the background picture and which belong to a foreground image,
    wherein the picture element determining means also classifies dots based on their shapes and designates dots with predetermined shapes as candidates for the background picture,
    wherein the picture element determining means also calculates cycles of dots based on their positions and removes picture elements for which cycles have not been successfully calculated as candidates for the background picture, classifying them as at least a part of the foreground image,
    wherein the picture element determining means also designates picture element remaining as candidates for the background picture as picture elements of the background picture, and
    wherein the background picture element removing means estimates a position of each background dot and determines whether the background dot should be entirely or partially removed, based on the shape, the cycle and the phase of the respective background dot, when the respective background dot is superposed on at least one of a plurality of picture elements constituting a character, a sign or a ruled line of the input image.

2. The watermarked information embedding apparatus according to claim 1, wherein the background picture element removing means removes a portion of a superposed background dot that is not superposed on at least one of the plurality of picture elements constituting a character, a sign, or a ruled line of the input image.

3. A watermarked information embedding apparatus which inputs an image having picture elements and embeds watermarked information in the input image, comprising:
    picture element determining means which determines whether it is a picture element constituting part of a background image for each of the picture elements which constitute the input image;
    background picture element removing means which removes all of background picture elements determined as picture elements constituting the background image by the picture element determining means; and
    watermarked information embedding means which embeds the watermarked information in an image constituted by picture elements from which the background picture elements have been removed by the background picture element removing means,
    wherein an aggregation of picture elements which constitute the input image forms dots,
    wherein the picture element determining means classifies picture elements constituting dots smaller than a predetermined size as picture elements which are to be removed as candidates for the background picture and which belong to a foreground image,
    wherein the picture element determining means also classifies dots based on their shapes and designates dots with predetermined shapes as candidates for the background picture,
    wherein the picture element determining means also calculates cycles of dots based on their positions and removes picture elements for which cycles have not been successfully calculated as candidates for the background picture, classifying them as at least a part of the foreground image, wherein the picture element determining means also designates picture element remaining as candidates for the background picture as picture elements of the background picture, and wherein the background picture element removing means estimates a portion of each background dot except for any superposed portion thereof, the superposed portion being a portion that is superposed on at least one of a plurality of picture elements constituting a character, a sign, or a ruled line of the input image.

4. A watermarked information embedding apparatus which inputs an image having picture elements and embeds watermarked information in the input image, comprising:

picture element determining means which determines whether it is a picture element constituting part of a background image for each of the picture elements which constitute the input image;

image separating means which separates, from the input image, a background image comprising background picture elements which are determined as picture elements constituting the background image by the picture element determining means; and watermarked information embedding means in which the background image of the input image is separated by the image separating means and the watermarked information is embedded in the remaining image;

wherein an aggregation of picture elements which constitute the input image forms dots, wherein the picture element determining means classifies picture elements constituting dots smaller than a predetermined size as picture elements which are to be removed as candidates for the background picture and which belong to a foreground image, wherein the picture element determining means also classifies dots based on their shape and designates dots with predetermined shapes as candidates for the background picture, wherein the picture element determining means also calculates cycles of dots based on their positions and removes picture elements for which cycles have not been successfully calculated as candidates for the background picture, classifying them as at least a part of the foreground image, wherein the picture element determining means also designates picture element remaining as candidates for the background picture as picture elements of the background picture, and wherein the picture elements of the background image form dots, and wherein, for each dot of the background image that is superposed on at least one of a plurality of pixel elements constituting a character, a sign, or a ruled line of the input image, the image separating means deletes a portion of the background dot except the superposed portion thereof.

5. A watermarked information embedding apparatus which inputs an image having picture elements and embeds watermarked information in the input image, comprising:

picture element determining means which determines whether it is a picture element constituting part of a background image for each of the picture elements which constitute the input image;

image separating means which separates, from the input image, a background image comprising background picture elements which are determined as picture elements constituting the background image by the picture element determining means; and watermarked information embedding means in which the background image of the input image is separated by the image separating means and the watermarked information is embedded in the remaining image;

wherein an aggregation of picture elements which constitute the input image forms dots, wherein the picture element determining means classifies picture elements constituting dots smaller than a predetermined size as picture elements which are to be removed as candidates for the background picture and which belong to a foreground image, wherein the picture element determining means also classifies dots based on their shapes and designates dots with predetermined shapes as candidates for the background picture, wherein the picture element determining means also calculates cycles of dots based on their positions and removes picture elements for which cycles have not been successfully calculated as candidates for the background picture, classifying them as at least a part of the foreground image, wherein the picture element determining means also designates picture element remaining as candidates for the background picture as picture elements of the background picture, and wherein the picture elements of the background image form dots, and wherein the image separating means estimates a portion of each background dot except for any superposed portion thereof, the superposed portion being a portion that is superposed on at least one of a plurality of picture elements constituting a character, a sign, or a ruled line of the input image.

6. A watermarked information embedding apparatus which inputs an image having picture elements and embeds watermarked information in the input image, comprising:

picture element determining means which determines whether it is a picture element constituting part of a background image for each of the picture elements which constitute the input image;

image separating means which separates, from the input image, a background image comprising background picture elements which are determined as picture elements constituting the background image by the picture element determining means; and watermarked information embedding means in which the background image of the input image is separated by the image separating means and the watermarked information is embedded in the remaining image;

wherein an aggregation of picture elements which constitute the input image forms dots, wherein the picture element determining means classifies picture elements constituting dots smaller than a predetermined size as picture elements which are to be removed as candidates for the background picture and which belong to a foreground image, wherein the picture element determining means also classifies dots based on their shapes and designates dots with predetermined shapes as candidates for the background picture, wherein the picture element determining means also calculates cycles of dots based on their positions and removes picture elements for which cycles have not been successfully calculated as candidates for the background picture, classifying them as at least a part of the foreground image, wherein the picture element determining means also designates picture element remaining as candidates for the background picture as picture elements of the background picture, and wherein the picture elements of the background image form dots, and the image separating means deletes, from the input image, a portion of any superposed background dot except for the superposed portion thereof, and records all of the picture elements constituting the superposed background dot, the superposed portion being a portion that is superposed on at least one of a plurality of picture elements constituting a character, a sign, or a ruled line of the input image.

7. A watermarked information embedding apparatus which inputs an image having picture elements and embeds watermarked information in the input image, comprising:

picture element determining means which determines whether it is a picture element constituting part of a background image for each of the picture elements which constitute the input image;

background picture element removing means which removes all of background picture elements determined as picture elements constituting the background image by the picture element determining means; and watermarked information embedding means which embeds the watermarked information in an image constituted by picture elements from which the background picture elements have been removed by the background picture element removing means, wherein an aggregation of picture elements which constitute the input image forms dots, wherein the picture element determining means classifies picture elements constituting dots smaller than a predetermined size as picture elements which are to be removed as candidates for the background picture and which belong to a foreground image, wherein the picture element determining means also classifies dots based on their shapes and designates dots with predetermined shapes as candidates for the background picture, wherein the picture element determining means also calculates cycles of dots based on their positions and removes picture elements for which cycles have not been successfully calculated as candidates for the background picture, classifying them as at least a part of the foreground image, wherein the picture element determining means also designates picture element remaining as candidates for the background picture as picture elements of the background picture, and wherein the background picture element removing means, to correct a deformation of an outline of a character of the input image, fills all monochrome picture elements in a given grid position of a grid of dots corresponding to the input image with white, and then returns selected picture element regions to monochrome based at least partly on proximity to the character.

* * * * *